US009336830B1

(12) United States Patent
Hurst et al.

(10) Patent No.: US 9,336,830 B1
(45) Date of Patent: *May 10, 2016

(54) TECHNIQUES FOR ANALYZING OPERATIONS OF ONE OR MORE RESTAURANTS

(71) Applicant: Panera, LLC, St. Louis, MO (US)

(72) Inventors: Blaine E. Hurst, Dedham, MA (US); Michael R. Nettles, Wildwood, MO (US)

(73) Assignee: Panera, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,109

(22) Filed: Dec. 28, 2015

Related U.S. Application Data (63) Continuation of application No. 14/032,701, filed on Sep. 20, 2013, now Pat. No. 9,257,150.

(51) Int. Cl.
| | |
|---|---|
| *H04N 7/12* | (2006.01) |
| *H04N 11/02* | (2006.01) |
| *H04N 11/04* | (2006.01) |
| *G11B 27/34* | (2006.01) |
| *G11B 27/30* | (2006.01) |
| *G06Q 30/02* | (2012.01) |
| *G06Q 50/12* | (2012.01) |
| *G06K 9/00* | (2006.01) |

(52) U.S. Cl.
CPC ............ *G11B 27/34* (2013.01); *G06K 9/00711* (2013.01); *G06Q 30/0201* (2013.01); *G06Q 50/12* (2013.01); *G11B 27/3081* (2013.01); *G06K 2009/00738* (2013.01)

(58) Field of Classification Search
None
See application file for complete search history.

(56) References Cited

U.S. PATENT DOCUMENTS

| | | | |
|---|---|---|---|
| 3,327,198 | A | 6/1967 | Rauch |
| 4,530,067 | A | 7/1985 | Dorr |
| 4,639,367 | A | 1/1987 | Mackies |
| 4,752,465 | A | 6/1988 | Mackies |
| 4,889,709 | A | 12/1989 | Mackles et al. |
| 4,969,560 | A | 11/1990 | Stanfield |
| 5,029,520 | A | 7/1991 | Okada |
| 5,068,121 | A | 11/1991 | Hansen et al. |
| 5,094,864 | A | 3/1992 | Pinon et al. |
| 5,097,759 | A | 3/1992 | Vilgrain et al. |

(Continued)

FOREIGN PATENT DOCUMENTS

WO    WO 01/59736 A2    8/2001

OTHER PUBLICATIONS

International Search Report and Written Opinion for PCT/US 14/53100 mailed Nov. 24, 2014.

(Continued)

*Primary Examiner* — Frederick Bailey
*Assistant Examiner* — Talha M Nawaz
(74) *Attorney, Agent, or Firm* — Wolf, Greenfield & Sacks, P.C.

(57) ABSTRACT

Embodiments of the invention provide techniques for using operational data and/or video footage to identify and diagnose operational issues. In some embodiments, business metrics represented in data produced by a restaurant's operational systems are identified and stored, conditions which warrant attention are identified, and the metrics that may indicate potential causes for those conditions are identified. Video footage may be correlated with business metric data to assist in diagnosing and remediating issues.

18 Claims, 4 Drawing Sheets

(56) References Cited

U.S. PATENT DOCUMENTS

| | | | |
|---|---|---|---|
| 5,123,337 A | 6/1992 | Vilgrain et al. |
| 5,312,561 A | 5/1994 | Hoshino et al. |
| 5,332,105 A | 7/1994 | Stanfield |
| 5,356,643 A | 10/1994 | Miller et al. |
| 5,357,426 A | 10/1994 | Morita et al. |
| 5,454,721 A | 10/1995 | Kuch |
| 5,685,435 A | 11/1997 | Picioccio et al. |
| 5,704,350 A | 1/1998 | Williams, III |
| 5,796,640 A | 8/1998 | Sugarman et al. |
| 5,876,995 A | 3/1999 | Bryan |
| 5,907,275 A | 5/1999 | Battistini et al. |
| 5,940,803 A | 8/1999 | Kanemitsu |
| 6,003,015 A | 12/1999 | Kang et al. |
| 6,087,927 A | 7/2000 | Battistini et al. |
| 6,102,162 A | 8/2000 | Teicher |
| 6,113,886 A | 9/2000 | Bryan |
| 6,152,358 A | 11/2000 | Bryan |
| 6,232,107 B1 | 5/2001 | Bryan et al. |
| 6,247,995 B1 | 6/2001 | Bryan |
| 6,415,224 B1 | 7/2002 | Wako et al. |
| 6,436,682 B1 | 8/2002 | Bryan et al. |
| 6,458,080 B1 | 10/2002 | Brown et al. |
| 6,527,712 B1 | 3/2003 | Brown et al. |
| 6,577,969 B2 | 6/2003 | Takeda et al. |
| 6,587,835 B1 | 7/2003 | Treyz et al. |
| 6,618,062 B1 | 9/2003 | Brown et al. |
| 6,636,835 B2 | 10/2003 | Ragsdale-Elliott et al. |
| 6,690,673 B1 | 2/2004 | Jarvis |
| 6,753,830 B2 | 6/2004 | Gelbman |
| 6,761,332 B1 | 7/2004 | Bengtsson |
| 6,787,108 B2 | 9/2004 | Ribi |
| 6,811,516 B1 | 11/2004 | Dugan |
| 6,924,781 B1 | 8/2005 | Gelbman |
| 6,940,394 B2 | 9/2005 | Gagnon |
| 6,987,452 B2 | 1/2006 | Yang |
| 7,024,369 B1 | 4/2006 | Brown et al. |
| 7,108,171 B1 | 9/2006 | Ergo et al. |
| 7,109,315 B2 | 9/2006 | Bryan et al. |
| 7,123,956 B2 | 10/2006 | Oguma |
| 7,132,926 B2 | 11/2006 | Vaseloff et al. |
| 7,321,866 B2 | 1/2008 | Kuwana et al. |
| 7,372,003 B2 | 5/2008 | Kates |
| 7,514,262 B2 | 4/2009 | Ribi |
| 7,536,283 B2 | 5/2009 | Potter et al. |
| 7,540,011 B2 | 5/2009 | Wixson et al. |
| 7,571,139 B1 | 8/2009 | Giordano et al. |
| 7,597,844 B2 | 10/2009 | Ribi |
| 7,617,129 B2 | 11/2009 | Momose |
| 7,658,329 B2 | 2/2010 | Gelbman |
| 7,669,768 B2 | 3/2010 | Gelbman |
| 7,673,464 B2 | 3/2010 | Bodin et al. |
| 7,673,800 B2 | 3/2010 | Gelbman |
| 7,677,454 B2 | 3/2010 | Gelbman |
| 7,703,678 B2 | 4/2010 | Gelbman |
| 7,706,915 B2 | 4/2010 | Mohapatra et al. |
| 7,735,735 B2 | 6/2010 | Gelbman |
| 7,735,736 B2 | 6/2010 | Gelbman |
| 7,743,987 B2 | 6/2010 | Gelbman |
| 7,748,626 B2 | 7/2010 | Gelbman |
| 7,748,627 B2 | 7/2010 | Gelbman |
| 7,753,276 B2 | 7/2010 | Gelbman |
| 7,753,277 B2 | 7/2010 | Gelbman |
| 7,753,772 B1 | 7/2010 | Walker et al. |
| 7,757,954 B2 | 7/2010 | Gelbman |
| 7,762,461 B2 | 7/2010 | Gelbman |
| 7,762,462 B2 | 7/2010 | Gelbman |
| 7,766,238 B2 | 8/2010 | Gelbman |
| 7,784,701 B2 | 8/2010 | Gelbman |
| 7,798,404 B2 | 9/2010 | Gelbman |
| 7,815,116 B2 | 10/2010 | Gelbman |
| 7,843,490 B2 | 11/2010 | Wixson et al. |
| 7,871,001 B2 | 1/2011 | Gelbman |
| 7,882,591 B2 | 2/2011 | Arnold |
| 7,891,569 B2 | 2/2011 | Gelbman |
| 7,899,709 B2 | 3/2011 | Allard et al. |
| 7,908,778 B1 | 3/2011 | Dushane |
| 7,913,908 B2 | 3/2011 | Gelbman |
| 7,918,395 B2 | 4/2011 | Gelbman |
| 7,918,396 B2 | 4/2011 | Gelbman |
| 7,946,489 B2 | 5/2011 | Gelbman |
| 7,953,873 B1 | 5/2011 | Madurzak |
| 7,958,457 B1 | 6/2011 | Brandenberg et al. |
| 7,973,642 B2 | 7/2011 | Schackmuth et al. |
| 7,976,386 B2 | 7/2011 | Tran |
| 8,054,218 B2 | 11/2011 | Gelbman |
| 8,078,492 B2 | 12/2011 | Brown et al. |
| 8,101,892 B2 | 1/2012 | Kates |
| 8,108,406 B2 | 1/2012 | Kenedy et al. |
| 8,181,821 B2 | 5/2012 | Freedman |
| 8,204,757 B2 | 6/2012 | Carlson et al. |
| 8,234,128 B2 | 7/2012 | Martucci et al. |
| 8,234,160 B2 | 7/2012 | Brown et al. |
| 8,291,484 B2 | 10/2012 | Hagens et al. |
| 8,453,228 B2 | 5/2013 | Hagens et al. |
| 8,549,571 B2 | 10/2013 | Loher et al. |
| 2001/0020935 A1 | 9/2001 | Gelbman |
| 2001/0054008 A1 | 12/2001 | Miller et al. |
| 2001/0054009 A1 | 12/2001 | Miller et al. |
| 2001/0054067 A1 | 12/2001 | Miller et al. |
| 2002/0002496 A1 | 1/2002 | Miller et al. |
| 2002/0003166 A1 | 1/2002 | Miller et al. |
| 2002/0004749 A1 | 1/2002 | Froseth et al. |
| 2002/0004942 A1 | 1/2002 | Bryan |
| 2002/0007307 A1 | 1/2002 | Miller et al. |
| 2002/0022963 A1 | 2/2002 | Miller et al. |
| 2002/0022992 A1 | 2/2002 | Miller et al. |
| 2002/0022993 A1 | 2/2002 | Miller et al. |
| 2002/0022994 A1 | 2/2002 | Miller et al. |
| 2002/0022995 A1 | 2/2002 | Miller et al. |
| 2002/0023959 A1 | 2/2002 | Miller et al. |
| 2002/0026357 A1 | 2/2002 | Miller et al. |
| 2002/0026358 A1 | 2/2002 | Miller et al. |
| 2002/0026369 A1 | 2/2002 | Miller et al. |
| 2002/0027164 A1 | 3/2002 | Mault et al. |
| 2002/0029181 A1 | 3/2002 | Miller et al. |
| 2002/0030105 A1 | 3/2002 | Miller et al. |
| 2002/0035439 A1 | 3/2002 | Takeda et al. |
| 2002/0046093 A1 | 4/2002 | Miller et al. |
| 2002/0049598 A1* | 4/2002 | Negreiro .............. G06K 17/00 704/275 |
| 2002/0052790 A1 | 5/2002 | Tomishima |
| 2002/0055878 A1 | 5/2002 | Burton et al. |
| 2002/0065717 A1 | 5/2002 | Miller et al. |
| 2002/0082924 A1 | 6/2002 | Koether |
| 2002/0095402 A1 | 7/2002 | Dillard et al. |
| 2002/0133418 A1 | 9/2002 | Hammond et al. |
| 2002/0138350 A1 | 9/2002 | Cogen |
| 2002/0147647 A1 | 10/2002 | Ragsdale-Elliott et al. |
| 2002/0152123 A1 | 10/2002 | Giordano et al. |
| 2002/0158137 A1 | 10/2002 | Grey et al. |
| 2002/0167500 A1 | 11/2002 | Gelbman |
| 2002/0174015 A1 | 11/2002 | Kuwana et al. |
| 2003/0007663 A1 | 1/2003 | Wixson et al. |
| 2003/0065561 A1 | 4/2003 | Brown et al. |
| 2003/0066096 A1 | 4/2003 | Bryan |
| 2003/0088471 A1 | 5/2003 | Tanigaki et al. |
| 2003/0092098 A1 | 5/2003 | Bryan et al. |
| 2003/0120506 A1 | 6/2003 | Komiya et al. |
| 2003/0158763 A1* | 8/2003 | McKee ................ G06Q 30/02 702/81 |
| 2003/0171944 A1 | 9/2003 | Fine et al. |
| 2003/0185706 A1 | 10/2003 | Ribi |
| 2003/0208396 A1 | 11/2003 | Miller et al. |
| 2003/0208409 A1 | 11/2003 | Mault |
| 2004/0010425 A1 | 1/2004 | Wilkes et al. |
| 2004/0034568 A1 | 2/2004 | Sone |
| 2004/0054592 A1 | 3/2004 | Hernblad |
| 2004/0078231 A1 | 4/2004 | Wilkes et al. |
| 2004/0107141 A1 | 6/2004 | Conkel et al. |
| 2004/0133483 A1 | 7/2004 | Potter et al. |
| 2004/0143512 A1 | 7/2004 | Sturr, Jr. |
| 2004/0158499 A1 | 8/2004 | Dev et al. |
| 2004/0167465 A1 | 8/2004 | Mihai et al. |
| 2004/0167804 A1 | 8/2004 | Simpson et al. |

(56) References Cited

U.S. PATENT DOCUMENTS

| | | |
|---|---|---|
| 2004/0172222 A1 | 9/2004 | Simpson et al. |
| 2004/0172300 A1 | 9/2004 | Mihai et al. |
| 2004/0172301 A1 | 9/2004 | Mihai et al. |
| 2004/0172302 A1 | 9/2004 | Martucci et al. |
| 2004/0176667 A1 | 9/2004 | Mihai et al. |
| 2004/0186783 A1 | 9/2004 | Knight et al. |
| 2004/0187146 A1 | 9/2004 | Iga |
| 2004/0199425 A1 | 10/2004 | Van Luchene et al. |
| 2004/0210621 A1 | 10/2004 | Antonellis |
| 2004/0230496 A1 | 11/2004 | Neuman et al. |
| 2004/0243471 A1 | 12/2004 | Salmen et al. |
| 2004/0243472 A1 | 12/2004 | Vadiinia |
| 2004/0249497 A1 | 12/2004 | Saigh et al. |
| 2004/0249724 A1 | 12/2004 | Gosewehr |
| 2004/0257918 A1 | 12/2004 | Ribi |
| 2004/0260607 A1 | 12/2004 | Robbins et al. |
| 2005/0004843 A1 | 1/2005 | Heflin |
| 2005/0010808 A1 | 1/2005 | Wixson et al. |
| 2005/0012818 A1 | 1/2005 | Kiely et al. |
| 2005/0027174 A1 | 2/2005 | Benardot |
| 2005/0037498 A1 | 2/2005 | Ribi |
| 2005/0046547 A1 | 3/2005 | Gagnon |
| 2005/0055242 A1 | 3/2005 | Bello et al. |
| 2005/0055244 A1 | 3/2005 | Mullan et al. |
| 2005/0065817 A1 | 3/2005 | Mihai et al. |
| 2005/0080650 A1 | 4/2005 | Noel |
| 2005/0104730 A1 | 5/2005 | Yang |
| 2005/0114150 A1 | 5/2005 | Franklin |
| 2005/0144066 A1 | 6/2005 | Cope et al. |
| 2005/0160005 A1 | 7/2005 | Roth et al. |
| 2005/0171902 A1 | 8/2005 | Nguyen |
| 2005/0177859 A1 | 8/2005 | Valentino et al. |
| 2005/0193901 A1 | 9/2005 | Buehler |
| 2005/0209963 A1 | 9/2005 | Momose |
| 2005/0211775 A1 | 9/2005 | Vaseloff et al. |
| 2005/0266491 A1 | 12/2005 | Bryan et al. |
| 2005/0267811 A1 | 12/2005 | Almblad |
| 2005/0272111 A1 | 12/2005 | Bryan et al. |
| 2005/0278065 A1 | 12/2005 | Garza |
| 2006/0015904 A1 | 1/2006 | Marcus |
| 2006/0053505 A1 | 3/2006 | Bryan |
| 2006/0064447 A1 | 3/2006 | Malkov |
| 2006/0069461 A1 | 3/2006 | Kaneko et al. |
| 2006/0149416 A1 | 7/2006 | Mohapatra et al. |
| 2006/0149642 A1 | 7/2006 | Dillard et al. |
| 2006/0169787 A1 | 8/2006 | Gelbman |
| 2006/0173754 A1 | 8/2006 | Burton et al. |
| 2006/0178986 A1 | 8/2006 | Giordano et al. |
| 2006/0186197 A1 | 8/2006 | Rosenberg |
| 2006/0213904 A1 | 9/2006 | Kates |
| 2006/0218039 A1 | 9/2006 | Johnson |
| 2006/0293965 A1 | 12/2006 | Burton |
| 2007/0005434 A1 | 1/2007 | Roth et al. |
| 2007/0024551 A1 | 2/2007 | Gelbman |
| 2007/0088624 A1 | 4/2007 | Vaughn et al. |
| 2007/0132844 A1 | 6/2007 | Katz |
| 2007/0150375 A1 | 6/2007 | Yang |
| 2007/0152810 A1* | 7/2007 | Livingston ............ G06Q 10/08 340/539.1 |
| 2007/0158335 A1 | 7/2007 | Mansbery |
| 2007/0168223 A1 | 7/2007 | Fors et al. |
| 2007/0190501 A1 | 8/2007 | Brown et al. |
| 2007/0198432 A1 | 8/2007 | Pitroda et al. |
| 2007/0243934 A1 | 10/2007 | Little et al. |
| 2007/0264395 A1 | 11/2007 | Adams et al. |
| 2007/0265935 A1 | 11/2007 | Woycik et al. |
| 2007/0298885 A1 | 12/2007 | Tran |
| 2008/0026816 A1 | 1/2008 | Sammon et al. |
| 2008/0033827 A1 | 2/2008 | Kuang et al. |
| 2008/0033935 A1 | 2/2008 | Frank |
| 2008/0033936 A1 | 2/2008 | Frank |
| 2008/0033944 A1 | 2/2008 | Frank |
| 2008/0034001 A1 | 2/2008 | Noel |
| 2008/0040336 A1 | 2/2008 | Frank |
| 2008/0047282 A1 | 2/2008 | Bodin et al. |
| 2008/0047781 A1 | 2/2008 | Feiertag |
| 2008/0065505 A1 | 3/2008 | Plastina et al. |
| 2008/0065685 A1 | 3/2008 | Frank |
| 2008/0107304 A1* | 5/2008 | Coulter ............ G06K 9/00369 382/103 |
| 2008/0157961 A1 | 7/2008 | Park et al. |
| 2008/0189172 A1 | 8/2008 | Goren et al. |
| 2008/0199155 A1 | 8/2008 | Hagens et al. |
| 2008/0204246 A1 | 8/2008 | Kates |
| 2008/0208787 A1 | 8/2008 | Luchene |
| 2008/0228600 A1 | 9/2008 | Treyz et al. |
| 2008/0255930 A1 | 10/2008 | Cope et al. |
| 2008/0255941 A1 | 10/2008 | Otto et al. |
| 2008/0270324 A1 | 10/2008 | Allard et al. |
| 2008/0276199 A1 | 11/2008 | Hosogai et al. |
| 2008/0295207 A1 | 11/2008 | Baum et al. |
| 2008/0297442 A1 | 12/2008 | Gelbman |
| 2008/0297454 A1 | 12/2008 | Gelbman |
| 2008/0309551 A1 | 12/2008 | Gelbman |
| 2008/0313052 A1 | 12/2008 | Otto et al. |
| 2008/0314991 A1 | 12/2008 | Gelbman |
| 2008/0314992 A1 | 12/2008 | Gelbman |
| 2008/0318679 A1 | 12/2008 | Tran et al. |
| 2009/0014512 A1 | 1/2009 | Gelbman |
| 2009/0014517 A1 | 1/2009 | Gelbman |
| 2009/0014528 A1 | 1/2009 | Gelbman |
| 2009/0014529 A1 | 1/2009 | Gelbman |
| 2009/0014530 A1 | 1/2009 | Gelbman |
| 2009/0014531 A1 | 1/2009 | Gelbman |
| 2009/0014532 A1 | 1/2009 | Gelbman |
| 2009/0014533 A1 | 1/2009 | Gelbman |
| 2009/0014534 A1 | 1/2009 | Gelbman |
| 2009/0014535 A1 | 1/2009 | Gelbman |
| 2009/0014536 A1 | 1/2009 | Gelbman |
| 2009/0014537 A1 | 1/2009 | Gelbman |
| 2009/0014538 A1 | 1/2009 | Gelbman |
| 2009/0014539 A1 | 1/2009 | Gelbman |
| 2009/0014540 A1 | 1/2009 | Gelbman |
| 2009/0014541 A1 | 1/2009 | Gelbman |
| 2009/0014542 A1 | 1/2009 | Gelbman |
| 2009/0015427 A1 | 1/2009 | Gelbman |
| 2009/0020605 A1 | 1/2009 | Gelbman |
| 2009/0020614 A1 | 1/2009 | Gelbman |
| 2009/0026273 A1 | 1/2009 | Gelbman |
| 2009/0026274 A1 | 1/2009 | Gelbman |
| 2009/0039169 A1 | 2/2009 | Gelbman |
| 2009/0048878 A1 | 2/2009 | Metcalf |
| 2009/0064445 A1 | 3/2009 | Arnold |
| 2009/0106124 A1 | 4/2009 | Yang |
| 2009/0119168 A1 | 5/2009 | Otto et al. |
| 2009/0125380 A1 | 5/2009 | Otto et al. |
| 2009/0150193 A1 | 6/2009 | Hong et al. |
| 2009/0167553 A1 | 7/2009 | Hong et al. |
| 2009/0172035 A1 | 7/2009 | Lessing et al. |
| 2009/0192901 A1 | 7/2009 | Egeresi |
| 2009/0196958 A1 | 8/2009 | Sosebee |
| 2009/0222730 A1 | 9/2009 | Wixson et al. |
| 2009/0228336 A1 | 9/2009 | Giordano et al. |
| 2009/0241481 A1 | 10/2009 | Sus et al. |
| 2009/0275002 A1 | 11/2009 | Hoggle |
| 2009/0281903 A1 | 11/2009 | Blatstein |
| 2009/0307096 A1 | 12/2009 | Antonellis |
| 2010/0005489 A1 | 1/2010 | Losey |
| 2010/0012676 A1 | 1/2010 | Freedman |
| 2010/0024361 A1 | 2/2010 | Ebeling |
| 2010/0030661 A1 | 2/2010 | Friedland et al. |
| 2010/0064394 A1 | 3/2010 | Baum et al. |
| 2010/0076854 A1 | 3/2010 | Martucci et al. |
| 2010/0082444 A1 | 4/2010 | Lin et al. |
| 2010/0082485 A1 | 4/2010 | Lin et al. |
| 2010/0114595 A1 | 5/2010 | Richard |
| 2010/0129502 A1 | 5/2010 | Feinberg et al. |
| 2010/0136179 A1 | 6/2010 | Mochizuki et al. |
| 2010/0161446 A1 | 6/2010 | Alfred et al. |
| 2010/0169262 A1 | 7/2010 | Kenedy et al. |
| 2010/0169313 A1 | 7/2010 | Kenedy et al. |
| 2010/0169338 A1 | 7/2010 | Kenedy et al. |
| 2010/0169340 A1 | 7/2010 | Kenedy et al. |
| 2010/0169342 A1 | 7/2010 | Kenedy et al. |

(56) References Cited

U.S. PATENT DOCUMENTS

| | | |
|---|---|---|
| 2010/0169343 A1 | 7/2010 | Kenedy et al. |
| 2010/0241707 A1 | 9/2010 | Burton et al. |
| 2010/0312385 A1 | 12/2010 | Deuber |
| 2010/0324962 A1 | 12/2010 | Nesler et al. |
| 2010/0332571 A1* | 12/2010 | Healey ............... G06F 19/3475 707/759 |
| 2011/0010623 A1 | 1/2011 | Vanslette et al. |
| 2011/0031236 A1 | 2/2011 | Ben-Shmuel et al. |
| 2011/0063500 A1 | 3/2011 | Loher et al. |
| 2011/0070566 A1 | 3/2011 | Hanulak et al. |
| 2011/0093363 A1 | 4/2011 | Blatstein |
| 2011/0106698 A1 | 5/2011 | Isaacson et al. |
| 2011/0136516 A1 | 6/2011 | Ellis |
| 2011/0160550 A1 | 6/2011 | Hwang et al. |
| 2011/0187664 A1 | 8/2011 | Rinehart |
| 2011/0218839 A1 | 9/2011 | Shamaiengar |
| 2011/0225032 A1 | 9/2011 | Kobres |
| 2011/0253482 A1 | 10/2011 | Purgatorio et al. |
| 2011/0258011 A1 | 10/2011 | Burns et al. |
| 2011/0261049 A1 | 10/2011 | Cardno et al. |
| 2011/0282726 A1 | 11/2011 | Brown et al. |
| 2011/0321127 A1 | 12/2011 | Pitroda et al. |
| 2012/0005077 A1 | 1/2012 | Pitroda et al. |
| 2012/0005078 A1 | 1/2012 | Pitroda et al. |
| 2012/0005079 A1 | 1/2012 | Pitroda et al. |
| 2012/0005080 A1 | 1/2012 | Pitroda et al. |
| 2012/0005081 A1 | 1/2012 | Pitroda et al. |
| 2012/0005082 A1 | 1/2012 | Pitroda et al. |
| 2012/0005083 A1 | 1/2012 | Pitroda et al. |
| 2012/0005084 A1 | 1/2012 | Pitrotda et al. |
| 2012/0005085 A1 | 1/2012 | Pitroda et al. |
| 2012/0005086 A1 | 1/2012 | Pitroda et al. |
| 2012/0005087 A1 | 1/2012 | Pitroda et al. |
| 2012/0005088 A1 | 1/2012 | Pitroda et al. |
| 2012/0005089 A1 | 1/2012 | Pitroda et al. |
| 2012/0005090 A1 | 1/2012 | Pitroda et al. |
| 2012/0005091 A1 | 1/2012 | Pitroda et al. |
| 2012/0005092 A1 | 1/2012 | Pitroda et al. |
| 2012/0005725 A1 | 1/2012 | Pitroda et al. |
| 2012/0005726 A1 | 1/2012 | Pitroda et al. |
| 2012/0011058 A1 | 1/2012 | Pitroda et al. |
| 2012/0029928 A1 | 2/2012 | Kountotsis |
| 2012/0069131 A1 | 3/2012 | Abelow |
| 2012/0075168 A1 | 3/2012 | Osterhout et al. |
| 2012/0078734 A1 | 3/2012 | Sus et al. |
| 2012/0084135 A1 | 4/2012 | Nissan et al. |
| 2012/0096403 A1 | 4/2012 | Jung et al. |
| 2012/0098970 A1 | 4/2012 | Amini et al. |
| 2012/0101831 A1 | 4/2012 | Pitroda et al. |
| 2012/0101832 A1 | 4/2012 | Pitroda et al. |
| 2012/0101833 A1 | 4/2012 | Pitroda et al. |
| 2012/0101834 A1 | 4/2012 | Pitroda et al. |
| 2012/0101835 A1 | 4/2012 | Pitroda et al. |
| 2012/0101836 A1 | 4/2012 | Pitroda et al. |
| 2012/0109667 A1 | 5/2012 | Pitroda et al. |
| 2012/0109668 A1 | 5/2012 | Pitroda et al. |
| 2012/0109669 A1 | 5/2012 | Pitroda et al. |
| 2012/0109670 A1 | 5/2012 | Pitroda et al. |
| 2012/0109671 A1 | 5/2012 | Pitroda et al. |
| 2012/0109672 A1 | 5/2012 | Pitroda et al. |
| 2012/0109673 A1 | 5/2012 | Pitroda et al. |
| 2012/0109674 A1 | 5/2012 | Pitroda et al. |
| 2012/0116790 A1 | 5/2012 | Pitroda et al. |
| 2012/0116959 A1 | 5/2012 | Pitroda et al. |
| 2012/0129517 A1 | 5/2012 | Fox et al. |
| 2012/0131034 A1 | 5/2012 | Kenedy et al. |
| 2012/0150599 A1 | 6/2012 | Isaacson et al. |
| 2012/0150600 A1 | 6/2012 | Isaacson et al. |
| 2012/0150605 A1 | 6/2012 | Isaacson et al. |
| 2012/0150610 A1 | 6/2012 | Isaacson et al. |
| 2012/0150615 A1 | 6/2012 | Isaacson et al. |
| 2012/0150643 A1 | 6/2012 | Wolfe et al. |
| 2012/0150728 A1 | 6/2012 | Isaacson et al. |
| 2012/0150729 A1 | 6/2012 | Isaacson et al. |
| 2012/0150730 A1 | 6/2012 | Isaacson et al. |
| 2012/0150731 A1 | 6/2012 | Isaacson et al. |
| 2012/0150732 A1 | 6/2012 | Isaacson et al. |
| 2012/0150743 A1 | 6/2012 | Isaacson et al. |
| 2012/0156337 A1 | 6/2012 | Studor et al. |
| 2012/0156339 A1 | 6/2012 | Studor et al. |
| 2012/0156343 A1 | 6/2012 | Studor et al. |
| 2012/0156344 A1 | 6/2012 | Studor et al. |
| 2012/0166267 A1 | 6/2012 | Beatty et al. |
| 2012/0173336 A1 | 7/2012 | Strumolo |
| 2012/0183932 A1 | 7/2012 | Chang et al. |
| 2012/0185305 A1 | 7/2012 | Brown et al. |
| 2012/0190386 A1 | 7/2012 | Anderson |
| 2012/0194418 A1 | 8/2012 | Osterhout et al. |
| 2012/0194419 A1 | 8/2012 | Osterhout et al. |
| 2012/0194420 A1 | 8/2012 | Osterhout et al. |
| 2012/0194549 A1 | 8/2012 | Osterhout et al. |
| 2012/0194550 A1 | 8/2012 | Osterhout et al. |
| 2012/0194551 A1 | 8/2012 | Osterhout et al. |
| 2012/0194552 A1 | 8/2012 | Osterhout et al. |
| 2012/0200488 A1 | 8/2012 | Osterhout et al. |
| 2012/0200499 A1 | 8/2012 | Osterhout et al. |
| 2012/0200601 A1 | 8/2012 | Osterhout et al. |
| 2012/0331499 A1 | 12/2012 | Hagens et al. |
| 2013/0027561 A1 | 1/2013 | Lee et al. |
| 2013/0166334 A1* | 6/2013 | Liberty ................. G06Q 30/06 705/5 |
| 2013/0198345 A1 | 8/2013 | Hagens et al. |
| 2013/0282624 A1 | 10/2013 | Schackmuth et al. |
| 2014/0122186 A1 | 5/2014 | Hurst |
| 2014/0316915 A1* | 10/2014 | Hickey ................. G06Q 30/00 705/15 |
| 2015/0086179 A1 | 3/2015 | Hurst et al. |
| 2015/0088594 A1 | 3/2015 | Hurst et al. |

OTHER PUBLICATIONS

International Search Report and Written Opinion for PCT/US14/053132 mailed Dec. 17, 2014.

Written Opinion for PCT/US14/53100 mailed Sep. 23, 2015.

International Search Report and Written Opinion for PCT/US13/67388 mailed May 2, 2014.

Liddle, Alan J. "Eat 'n Park breaks down video surveillance strategy", pp. 1-3, Nov. 26, 2012, http://nrn.com/latest-headlines/eat-n-park-breaks-down-video-surveillance-strategy.

\* cited by examiner

TECHNIQUES FOR ANALYZING OPERATIONS OF ONE OR MORE RESTAURANTS

RELATED APPLICATION

This application is a continuation of commonly assigned, co-pending U.S. patent application Ser. No. 14/032,701, filed Sep. 20, 2013, entitled "TECHNIQUES FOR ANALYZING OPERATIONS OF ONE OR MORE RESTAURANTS,", the entirety of which is incorporated herein by reference.

BACKGROUND

Many restaurants and restaurant chains employ automated systems to collect operational data, such as systems designed to monitor kitchen operations, or to collect data on a customer's experience within the restaurant, such as point of sale systems. Typically, the data produced by these systems is loaded to a centralized business analytics platform for examination by analysts who query the data to attempt to identify trends, business opportunities, etc. Often, this type of analysis is performed on large volumes of data collected from numerous restaurants, long after the data has been collected.

SUMMARY

The inventors have appreciated a need to provide meaningful information, guidance and assistance to employees responsible for managing restaurant operations, as operational issues arise. The inventors have further appreciated that existing tools (e.g., operational systems which produce voluminous amounts of data, centralized business analytics platforms) and techniques (e.g., attempting to identify opportunities for operational improvement by querying large volumes of centrally stored data, long after the data is collected) are ill-suited to satisfying this need. Accordingly, some embodiments of the invention provide systems and methods for using operational data to identify and diagnose operational issues in real or near-real time, so that meaningful information, guidance and assistance may be provided.

For example, some embodiments of the invention provide the capability to identify and store key business metrics represented in data produced by a restaurant's operational systems, to identify conditions which warrant attention, and to identify the metric(s) that indicate potential causes for those conditions. As such, embodiments of the invention may serve to focus an employee's (e.g., a restaurant manager's) attention on the information that most likely explains why an operational problem is occurring, as it is occurring. Some embodiments of the invention may issue recommendations on how to fix the problem, and/or may address aspects of the problem automatically, without employee intervention.

In some embodiments of the invention, video footage may be captured of occurrences in the restaurant, and this video may be correlated with business metric data to assist in diagnosing and remediating operational issues. For example, once a condition warranting attention is identified, a review of video footage of processes which have been preliminarily identified as potential causes for the condition (e.g., using the data-driven analysis described above) may reveal that the condition results from a different issue than what was originally suspected. The video footage may also, for example, reveal the appropriate steps to take to address the condition. Moreover, review of the video footage may indicate additional types of analysis to be performed in the future to reduce the likelihood that the condition will arise again, and/or additional types of information that may be collected to support the analysis. In addition, the video footage may be a valuable tool in training employees to avoid the causes for the condition going forward.

Some embodiments of the invention provide a method for use in a system comprising at least one repository storing data relating to operations of a restaurant and a video capture system for capturing video footage depicting operations of the restaurant. The data comprises information relating to a plurality of events and a plurality of alert conditions including a first alert condition. The method comprises acts of: (A) identifying, from among the plurality of events, one or more events occurring substantially contemporaneously with the first alert condition; (B) identifying video footage captured by the video capture system corresponding to the one or more events; and (C) causing the video footage corresponding to the one or more events to be displayed via a review interface to a user.

Other embodiments of the invention provide at least one non-transitory storage device storing instructions which, when executed in a system comprising at least one repository storing data relating to operations of a restaurant and a video capture system for capturing video footage depicting operations of the restaurant, the data comprising information relating to a plurality of events and a plurality of alert conditions including a first alert condition, perform a method comprising acts of: (A) identifying, from among the plurality of events, one or more events occurring substantially contemporaneously with the first alert condition; (B) identifying video footage corresponding to the one or more events; and (C) causing the video footage corresponding to the one or more events to be displayed via a review interface to a user.

Other embodiments of the invention provide a computer system, comprising: at least one repository storing data relating to operations of a restaurant, the data comprising information relating to a plurality of events and a plurality of alert conditions including a first alert condition; a video capture system for capturing video footage depicting operations of the restaurant; and at least one computer processor programmed to: identify, from among the plurality of events, one or more events occurring substantially contemporaneously with the first alert condition; identify video footage corresponding to the one or more events; and cause the video footage corresponding to the one or more events to be displayed via a review interface to a user.

The foregoing provides a non-limiting overview of certain embodiments of the invention. Some embodiments of the invention are defined in the attached claims.

BRIEF DESCRIPTION OF DRAWINGS

The accompanying drawings are not intended to be drawn to scale. In the drawings, each identical or nearly identical component illustrated in the various figures is represented by a like numeral. For purposes of clarity, not every component may be labeled in every drawing. In the drawings.

DETAILED DESCRIPTION

Some embodiments of the invention provide techniques for using operational data and/or video footage to identify and diagnose operational issues. In this respect, some embodiments provide the capability to identify and store key business metrics represented in data produced by a restaurant's operational systems, to identify conditions which warrant attention, and to identify the metrics that indicate potential causes for those conditions. As such, embodiments of the invention may serve to focus attention on the information that most likely explains why an operational problem is occurring, as it is occurring. Video footage may be correlated with the business metric data to assist in diagnosing and remediating issues. For example, once a condition warranting attention is identified, a review of video footage of processes or situations which have been preliminarily identified as potential causes for the condition based on data-driven analysis may reveal that the condition is caused by another issue entirely. By correlating video and data, embodiments of the invention may provide powerful tools for issue diagnosis and remediation.

Figure 1:
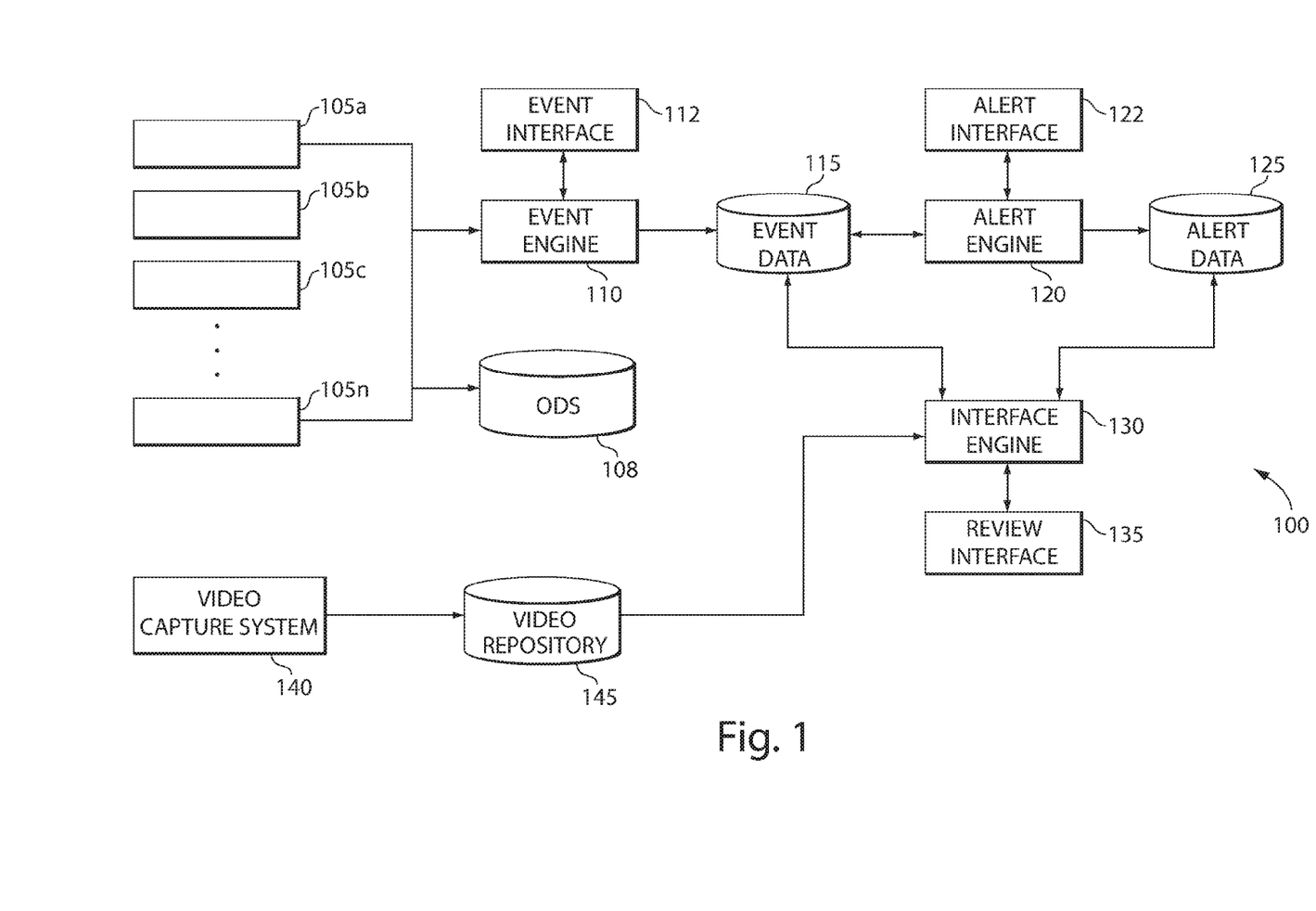
FIG. 1 is a block diagram depicting a representative system for analyzing restaurant operations, in accordance with some embodiments of the invention.

FIG. 1 depicts a representative system 100 comprising various components for analyzing the operations of a restaurant. Representative system 100 includes operational systems 105a, 105b, 105c and 105n, which capture various data relating to restaurant operations and the customer's experience. Operational systems 105a-105n may include, for example, systems for monitoring and/or facilitating kitchen operations, for managing staff, for conducting point of sale transactions, and/or for facilitating any of numerous aspects of restaurant operations. Any suitable type of system, for monitoring any suitable aspect(s) of a restaurant's operations, may be employed. Although only four operational systems 105 are shown in FIG. 1, it should be understood that any suitable number of operational systems may include in a system implemented in accordance with embodiments of the invention.

Operational data store (ODS) 108 receives and stores data produced by operational systems 105a-105n. In some implementations, ODS 108 may store any suitable information. For example, ODS 108 may store the date and time composition of individual transactions (e.g., measured by transaction start, time stored at tender, time sent to line, time worked at line, time sent to expediter, time delivered to customer, and/or the time of any other suitable occurrence relating to a transaction), item information associated with each transactions (e.g., including item codes for items included in each transaction, modifiers, additions to or subtractions from an item requested by a customer, and/or any other suitable item information), employee information associated with individual transactions (e.g., the employee code(s) for the cashier or associate who received the customer's order, the code(s) for production, expediter, and/or backer employees who handled a transaction during preparation, and/or any other suitable employee information), and/or other information. Although ODS 108 is depicted in FIG. 1 as a single repository, the data included in ODS 108 may be distributed across any suitable number of data stores. Data may be stored in ODS 108 using any suitable tools and/or techniques.

Event engine 110 also receives data produced by operational systems 105a-105n. In accordance with some embodiments of the invention, event engine 110 executes queries on data produced by operational systems 105a-105n to identify and summarize key business metrics. (In the description that follows, business metrics may also be referred to as "events," although it is to be understood that an "event" may relate to more than one occurrence or transaction, or to no specific occurrence at all. The terms "event" and "metric" are used herein interchangeably.) In some embodiments, event engine 110 executes queries on data produced by operational systems 105a-105n so that queries need not be executed on ODS 108 to support later analysis. In this respect, it should be appreciated that ODS 108 may store large amounts of data, so that query execution may be time-consuming.

Event engine 110 may identify and/or summarize any suitable metric(s) represented in the data produced by operational systems 105a-105n. Some basic examples include "speed of service" measures for specific intervals relating to a transaction (e.g., the amount of time between an order being opened and tender occurring, the amount of time between a make line position receiving the order and the order being "bumped" to the next position, the amount of time between an expediter receiving the order and the order being "bumped" to the next position, the amount of time between the order being received and customer delivery occurring, the total service time, the amount of time between a drive through order being received and pickup occurring, the amount of time between an order being ready and delivery occurring to the customer's table, home, or business, and/or any other suitable intervals), "bump" activity for various make line locations (e.g., total preparation times for salads, Panini, sandwiches, and/or any other suitable "bump" measures), and labor shift metrics (e.g., current and trending labor burn rate, current and trending production velocity, current and trending transaction counts, manager on duty, number of employees currently in training, and/or any other suitable labor shift metrics). In representative system 100, the results of the filtering and pre-analysis performed by event engine 110 is stored in event data 115. As with ODS 108, although event data 115 is depicted in FIG. 1 as a single repository, the data stored thereby may be distributed (logically and/or physically) across any suitable number of data stores, and such data may be stored using any suitable tools and/or techniques.

In some embodiments of the invention, the queries executed by event engine 110 may be defined using event interface 112. Specifically, in some embodiments, event interface 112 enables a user (e.g., an analyst, executive, restaurant manager, and/or any other suitable resource) to define constructs representing metrics to be captured by event engine 110. These constructs may be defined in any suitable way(s). For example, in some embodiments, a construct may be defined using logical operations, such as Boolean functions. A simple example of a Boolean function used to identify when data produced by operational systems 105a-105n indicates that a "speed of service" measure for a particular menu item is too long is shown below. In this example, if the "speed of service" measure for transactions associated with a particular menu item exceeds five minutes, then an event named "speed of service too slow" is created and stored in event data 115.

Event=speed of service too slow
— IF—"speed of service"—FOR—"menu item"— GREATER THAN—"5 minutes"—THEN—"record item SOS infraction"

Store Event as "speed of service too slow" for "menu item"

It should be appreciated that a construct used to represent business metrics to be captured by event engine 110 need not be defined using Boolean functions. Any suitable technique(s) may be employed to identify and/or summarize key business metrics from data produced by operational systems.

Event interface 112 may be implemented using any suitable collection of hardware and/or software components. For example, event interface 112 may comprise a standalone application suitable for execution on a desktop computer (e.g., sitting in a restaurant manager's office), a web-based application running on a computer (e.g., server computer) accessible over a network (e.g., the Internet, a local area network, a wide area network, or some combination thereof), an "app" suitable for execution on a mobile device (e.g., a smartphone, tablet computer, and/or other mobile device), and/or any other suitable collection comprising hardware and/or software components. Embodiments of the invention are not limited to any particular manner of implementation.

In representative system 100, event data 115 is accessed by alert engine 120 to identify "alert conditions" represented in event data 115. An alert condition may, for example, be any condition which indicates an operational issue.

A condition represented in event data 115 may constitute an alert condition for any of numerous reasons. For example, an alert condition may comprise one or more metrics stored in event data 115 which satisfy a predetermined threshold (e.g., by reaching an event count, representing a predefined percent deviation from a previously observed norm, and/or satisfying another threshold). Satisfaction of a threshold may, for example, be evaluated in relation to a given time period (e.g., a day, day portion, predefined interval, etc.). Thus, to constitute an alert condition, a count of a certain event during a specific time period may exceed a predetermined threshold count.

In representative system 100, alert engine 120 executes queries on event data 115 to identify alert conditions. In some embodiments of the invention, the queries executed by alert engine 120 may be defined using alert interface 122. For example, alert interface 122 may enable a user (e.g., an analyst, executive, restaurant manager, and/or any other suitable resource) to define constructs representing alert conditions to be captured by alert engine 125. As with event interface 112, a construct may be defined using logical operations, such as Boolean functions. A simple example of a Boolean function used to identify an alert condition indicating that the count of "speed of service too slow" events (described above) exceeds a predefined threshold count of six is shown below. In this example, when the defined alert condition is satisfied, an alert named "menu item SOS opportunity" is created and stored in alert data 125.

Alert=menu item SOS opportunity
—IF—"count" of "speed of service too slow"—FOR—"menu item"—GREATER THAN—"count of 6"—THEN—"record menu item SOS infraction alert"
Store Alert as "Menu Item SOS Opportunity"

In some embodiments, alert interface 122 enables notifications to be sent when alert conditions are satisfied. For example, a user who defines an alert condition may indicate that when the condition is satisfied, a notification should be sent to certain other employees, a distribution group, a certain device (e.g., a mobile device), and/or any other suitable resource(s). Thus, when one alert condition is satisfied, a notification may be sent to the restaurant manager, when another when one alert condition is satisfied, a notification may be sent to an executive, etc. Alert notifications may be configured in any suitable fashion.

As with event interface 112, alert interface 122 may be implemented using any suitable collection of hardware and/or software components, as embodiments of the invention are not limited in this respect.

Whether a condition represented in event data 115 constitutes an alert condition may be defined in absolute terms, as in the example query above, or in variable terms. To illustrate the distinction, consider an example event/metric representing the "speed of service" measure for transactions relating to sandwich orders. A representative alert condition defined in absolute terms may, for example, indicate that the condition is satisfied if the speed of service for a particular sandwich order exceeds a certain predefined amount of time (e.g., five minutes). A representative alert condition defined in variable terms for this metric may, for example, be based on a comparison between the speed of service measure for one sandwich order and speed of service for other sandwich orders. For example, an alert condition may exist if the speed of service measure for a particular sandwich order deviates from the average speed of service measure across other sandwich orders (e.g., all other sandwich orders, other sandwich orders placed within a certain time period, and/or any other suitable subset) by a predetermined percentage. Because presumably the average speed of service for sandwich orders changes over time, the amount of time by which a particular sandwich order must deviate from the average to constitute an alert condition also varies.

Of course, an alert condition defined in variable terms need not be based on a comparison between one event/metric and other events/metrics. Continuing with the speed of service example to illustrate, an alert condition for speed of service for a sandwich order may be defined using a threshold amount of time which varies over the course of the day. The threshold amount of time may, for example, be longer during busy periods for the restaurant (as it may be expected that the restaurant's operations will slow down overall during these periods), and shorter during less busy periods (indicating less tolerance for completing customer orders slowly during these periods). Alert conditions may vary in any suitable way, as embodiments of the invention are not limited in this respect.

It should be appreciated that defining alert conditions in variable terms may make alert notifications more meaningful to recipients. For example, if a restaurant manager received an alert notification each time the speed of service measure for a sandwich order exceeded a predetermined, static amount of time, then during certain periods (e.g., busy times during the day), the notifications might be sent almost constantly, and after a period the manager may choose to ignore them. By sending notifications only when an underlying alert condition is warranted, some embodiments of the invention may make the notification more meaningful, and/or place the underlying alert condition in greater context.

Figure 2:
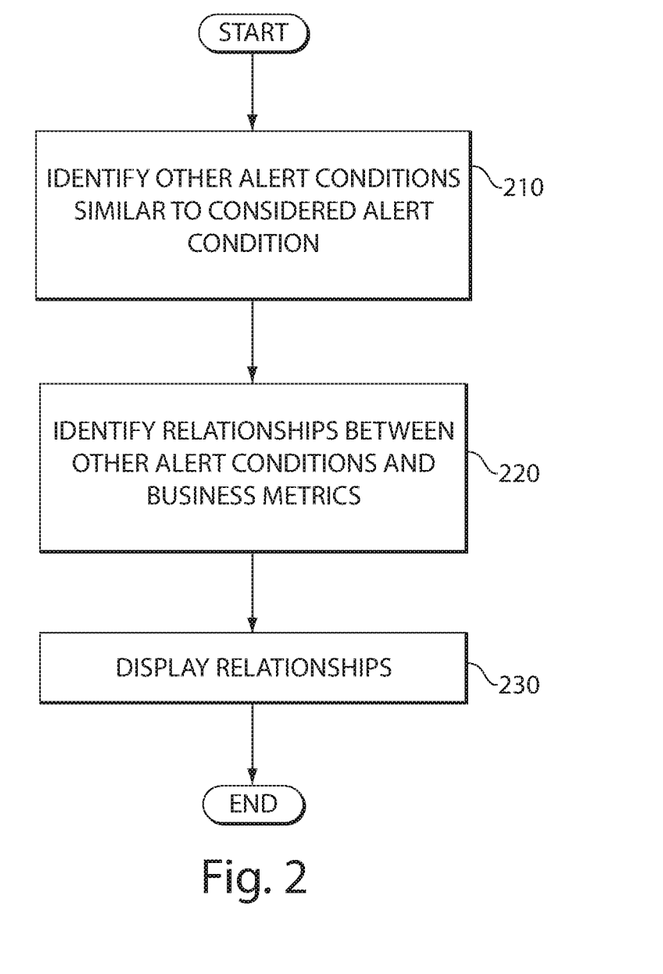
FIG. 2 is a flowchart of a representative process for analyzing restaurant operations, in accordance with some embodiments of the invention.

In representative system 100, inference engine 130 analyzes information stored in alert data 125 and event data 115 to identify relationships between business metrics and alert conditions. Specifically, inference engine 130 analyzes information in event data 115 to identify business metrics which indicate possible causes for an alert condition reflected in alert data 125. A representative process 200 for identifying business metrics which may indicate causes for an alert condition is depicted in FIG. 2.

At the start of representative process 200, in act 210, other alert conditions which are similar in some respect to the considered alert condition are identified. In this respect, the inventors have appreciated that evaluating other alert conditions which are similar in some respect to the considered alert condition may enable more accurate statistical analysis than evaluating only a single alert condition in isolation, since evaluating only a single alert condition may lead to a misdiagnosis of the metric(s) that contributed to its occurring. By analyzing multiple alert conditions in aggregate, embodiments of the invention may identify the metric(s) that have correlated most strongly with the alert condition over time.

Identifying alert conditions which are similar to the considered alert condition in some respect may be performed in any of numerous ways. For example, the other alert conditions may share one or more common characteristics, reflected in alert data 125, with the considered alert condition. For example, if the considered alert condition relates to speed of service measures for sandwich orders, then the other alert conditions which are identified in act 210 may also relate to speed of service measures for sandwich orders. The other alert conditions may, for example, be identified by querying alert data 125.

In some embodiments, the other alert conditions may have occurred previous to the considered alert condition. For example, evaluating alert conditions which occurred previous to the considered alert condition may provide useful insight into the business metrics that historically have correlated to the type of alert condition over time. However, embodiments of the invention are not so limited, as other alert conditions may have any suitable temporal relationship to the considered alert condition.

Representative process 200 then proceeds to act 220, wherein relationships between the alert conditions identified in act 210 and business metrics are identified. Relationships may be identified in any of numerous ways. For example, relationships between alert conditions and business metrics may be identified based at least in part on institutional knowledge. In this respect, inference engine 130 may, for example, apply business rules which codify known relationships between certain types of alert conditions and certain events or metrics which are observed substantially contemporaneously with alert conditions. For example, a business rule may specify that if an alert condition relates to the speed of service measure for sandwich orders exceeding a threshold amount of time, and information stored in event data 115 indicates that, at around the time the alert condition occurred, sales per labor hour exceeds a particular dollar amount, then an inference may be drawn that the restaurant is likely understaffed. As such, inference engine 130 may issue a recommendation to the restaurant manager to call in additional staff to work.

Relationships between business metrics and alert conditions need not be identified based on institutional knowledge. For example, statistical analysis may be performed to identify metrics indicating possible causes for alert conditions. Continuing with the example of an alert condition relating to the speed of service for sandwich orders exceeding a threshold amount of time, if information stored in event data 115 indicates that, at around the time the alert condition occurred, sales per labor hour is at acceptable levels, then other potential causes may be investigated. As such, inference engine 130 may analyze metrics stored in event data 115 to identify potential causes for the rise in speed of service, to identify the metric(s) that correlate most strongly to the alert condition over time.

Statistical analysis may take any suitable form, and correlations may be identified using any suitable statistical technique(s). In some embodiments, elimination queries may be executed to identify correlations between alert conditions and events/metrics which occurred or were recorded at the same time the alert conditions were recorded. Of course, embodiments of the invention are not limited to employing elimination queries, as any suitable technique for identifying correlations may be employed.

Representative process 200 then proceeds to act 230, wherein relationships between the considered alert condition and business metrics are displayed. For example, inference engine 130 may cause an indication of the relationships to be displayed by review interface 135. This may take any of numerous forms. For example, if statistical analysis was used in act 220 to identify the relationships, then act 230 may involve review interface 135 displaying a rank-ordered list showing business metric(s) which historically correlate most strongly to the alert condition. Act 230 may also or alternatively involve review interface 135 displaying recommendations (e.g., to a restaurant manager) on actions that may be taken to remediate the alert condition. Any suitable information may be displayed.

Review interface 135 may comprise any suitable interface, comprised of any suitable collection of hardware and/or software components. For example, review interface 135 may comprise a standalone application which executes on a desktop computer in the restaurant manager's office, a mobile web application executing on a server and accessed via a mobile device executing a browser application (e.g., a smartphone, tablet device, etc.), an "app" which executes on a mobile device, and/or any other hardware and/or software components.

At the completion of act 230, representative process 200 completes.

It should be appreciated that identifying and displaying relationships between business metrics and alert conditions may make remediation more effective. For example, if analysis of an alert condition relating to speed of service measures for sandwich orders indicates during the time that speed of service began to get longer, the number of customers arriving at the restaurant also rose markedly, that there was a relatively large number of employees on break, and that several of the employees that were working were focused on delivery orders rather than incoming foot traffic, then this may lead to a recommendation that employees be deployed differently to place more focus on the orders causing speed of service to rise. By contrast, a common reaction by restaurant managers to increases in speed of service is to call more staff in to work, which results in increased labor costs. By more effectively diagnosing the true cause for the rise in speed of service as employee station deployment, rather than the restaurant being presently understaffed, embodiments of the invention may make remediation more effective, and enable cost savings to be achieved in comparison to typical remediation efforts.

Some embodiments of the invention provide the capability to not only make recommendations on issue remediation, but to perform such remediation automatically. For example, given an alert condition relating to speed of service for sandwich orders exceeding a threshold amount of time, an analysis of event data 115 may indicate that speed of service is longest for e-commerce orders. As a result, system parameters relating to e-commerce orders may be modified to deal with the issue. For example, inference engine 130 may automatically modify the system parameter which controls the lead time that customers who place e-commerce orders are instructed to give before attempting to pick up their orders. For example, if the normal amount of suggest lead time given to customers is twelve minutes, then the system parameter may be changed to instruct customers to give fifteen minutes of lead time instead. Doing so may provide preparation staff more time to assemble subsequent orders, and help conditions settle down.

It should be appreciated that automatically resolving issues arising in the restaurant, rather than merely issuing recommendations to a manager on how to resolve them, may be extremely valuable because alert conditions are often most prevalent during busy periods, which is usually when the manager has the least amount of time and mental bandwidth to consult recommendations on how to resolve them. By addressing or ameliorating the issue automatically, some embodiments of the invention free the manager to focus on other tasks.

It should also be appreciated that any of numerous types of remediation actions may be taken automatically. For example, system parameters may be automatically modified, instructions to employees may be automatically issued, load balancing procedures may be automatically invoked, and/or any other type of action(s) may be taken, as embodiments of the invention are not limited in this respect.

Returning to FIG. 1, representative system 100 also includes video capture system 140, which may include components for capturing information useful for diagnosing operational issues and devising strategies for resolving them. Video capture system 140 may include one or more video capture devices (e.g., video surveillance cameras) which capture video footage depicting various aspects of restaurant operations. For example, video capture system 140 may capture video footage of point of sale transactions, order preparation processes, dining areas, and/or any other suitable occurrences and/or locations. In representative system 100, video capture system 140 captures video footage relating to events stored in event data 115, and stores the video footage in video repository 145, which may comprise any suitable storage component(s) and employ any suitable storage technique(s).

In representative system 100, inference engine 130 correlates video footage stored in video repository 145 to event data 115 and alert data 125. Correlation of video footage to event and alert data may have any of numerous uses. For example, video footage relating to metrics preliminarily identified as potential root causes for an alert condition (i.e., using the data-driven techniques described above) may provide evidence which either substantiates the preliminary diagnosis, or indicates that the event was not actually a cause of the alert condition. It should be appreciated, then, that the ability to correlate subjective, observational data with objective information stored in event data 115 and alert data 125 may prevent misdiagnosis of operational issues. For example, a restaurant manager investigating the cause of long speed of service measures for Panini orders may conclude, based only on alert data 125 and event data 115, that the Panini press operator is to blame (e.g., because event data suggests that the press operator makes Panini more slowly than other, comparably trained employees do). However, an examination of video footage of the Panini preparation station may reveal that the press operator is actually working as efficiently as other employees, but that the bin which stores the butter used to lubricate the press is consistently running out during the operator's shift on the press, so that he keeps needing to ask to have it refilled, which slows him down. In this example, a purely data-driven approach would cause the issue to be misdiagnosed, and the press operator to be unjustly blamed. By correlating video to the data, the true root cause (i.e., that the butter bin is not being filled frequently enough during the press operator's shift) may be revealed.

Also, once the root cause of an alert condition is identified, video footage depicting the root condition may serve as a useful training tool. For example, a restaurant manager may show video footage depicting the press operator waiting for the butter bin to be filled, and data showing the effect on speed of service measures, to the employee responsible for filling the bin, so that he understands the consequences of it not being filled on time.

Figure 3:
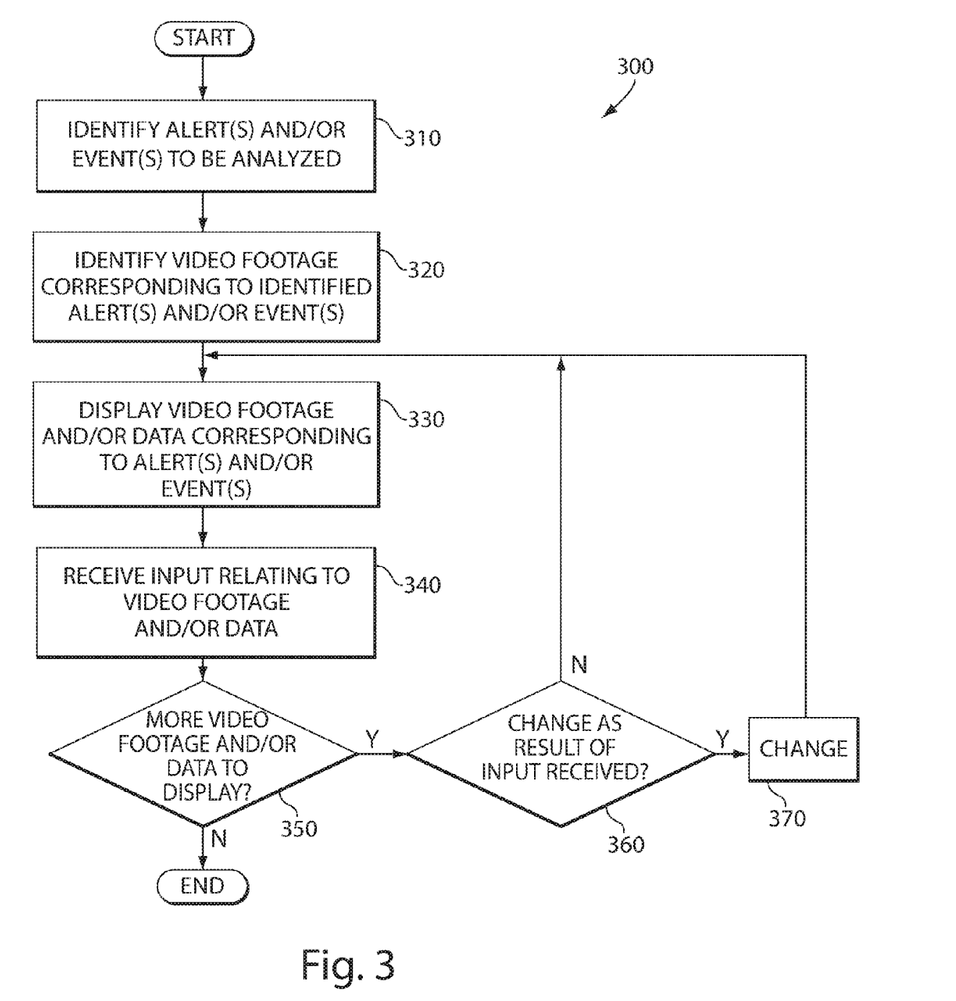
FIG. 3 is a flowchart of a representative process for analyzing operational data and corresponding video footage, in accordance with some embodiments of the invention.

FIG. 3 depicts a representative process 300 for using video footage and operational data to analyze operational issues. At the start of representative process 300, in act 310, the alert condition(s) and/or event(s) to be analyzed are identified, and then in act 320, the video footage corresponding to the considered alert condition(s) and/or event(s) is identified. This may be performed in any of numerous ways. For example, some representative techniques for correlating video footage to operational data are described in commonly assigned U.S. patent application Ser. No. 13/837,940, filed Mar. 15, 2013, entitled "Use Of Video To Manage Process Quality," which is incorporated herein by reference in its entirety. Some aspects of these techniques are summarized below.

In some embodiments, at least some of the records stored in event data 115 and alert data 125 include date and time stamps. A date and time stamp for a record may indicate, for example, when the record was first produced and stored in the associated repository. In addition, video footage stored in video repository 145 also includes date and time stamps. As a result, the date and time stamp for an alert or event record may be used to retrieve corresponding video footage (e.g., having a corresponding date and time stamp) from video repository 145.

Of course, a date and time stamp for video footage need not exactly match a date and time stamp for an alert or event record. For example, it may be desirable to retrieve video footage captured just before and/or just after an alert or event was recorded. As an example, if the date and time stamp for an alert or event record indicates it was recorded at a particular time, then video footage having a date and time stamp indicating it was captured starting thirty seconds prior to that time, and ending thirty seconds after that time, may be retrieved. The date and time stamps for an alert or event record and for corresponding video footage may have any suitable relationship, as embodiments of the invention are not limited in this respect.

Other information may also, or alternatively, be used to retrieve video footage which corresponds to an alert or event record. For example, if data included in an alert or event record to be analyzed indicates that it originated from a point of sale terminal, then this information may be used to identify the video footage to be retrieved (e.g., footage which shows the terminal). Similarly, if data included in an alert or event record indicates that it originated from a kitchen management system, then this information may be used to identify the video footage to be retrieved (e.g., footage that shows the restaurant's food preparation area). Any suitable information may be used to retrieve video footage from video repository 145.

At the completion of act 320, representative process 300 proceeds to act 330, wherein video footage and/or data corresponding to the alert condition(s) and/or event(s) is displayed. In some embodiments, video footage and/or data may be displayed via review interface 135, although any suitable display device(s) may be employed.

Display of video footage and/or data correlating to the alert condition(s) and/or event(s) may have any of numerous uses. In this respect, as noted above, a review of video footage corresponding to events, metrics or processes preliminarily identified as root causes for an alert condition may provide evidence which either supports or disproves the initial hypothesis, making it less likely that an operational issue is misdiagnosed. As an example, assume that an alert condition relating to speed of service measures for Panini orders is to be analyzed. Act 330 may involve displaying video footage to a restaurant manager of an employee operating the Panini press from 11:15 a.m. to 11:17 a.m., based on an initial hypothesis that variations in speed of service measures for Panini orders are the result of the Panini press operator not following prescribed preparation procedures at around this time (e.g., because event data indicates that the operator had to re-make several Panini during this timeframe). Reviewing the video footage may assist the restaurant manager in determining whether the alert condition was, in fact, the result of the press operator not following protocol for Panini preparation.

When act 330 completes, representative process 300 proceeds to act 340, wherein user input relating to the video footage and/or data displayed in act 330 is received. Input may take any of numerous forms. For example, in some embodiments, the input may include an indication whether or not video footage and/or data displayed in the act 330 is useful in analyzing the considered alert condition and/or event, such as if the video footage and/or data depicts or describes the root cause of the alert condition and/or event. Continuing with the example given in the preceding paragraph to illustrate, if video footage shown to the restaurant manager depicts the press operator making Panini according to prescribed procedures, and the restaurant manager also knows that the alert condition resulted from the Panini press accidentally losing power (which she remembers discovering just after the timeframe which is captured on video), then act 340 may involve the restaurant manager indicating that the video footage did not capture the cause of the alert condition.

It should be appreciated that even if the input received in act 340 indicates that video footage and/or data displayed in act 330 did not depict or describe the cause of an operational issue, that input may be useful in diagnosing operational issues going forward. For example, the user's input may serve as tacit acknowledgement that an alert condition or event was properly identified for their review, even if the video footage and/or data does not depict or describe the cause of the alert condition or event. Additionally, the user's input may point to additional analysis which could be performed (e.g., by alert engine 120 and/or inference engine 130) and/or data which could be captured (e.g., by event engine 110) to more effectively diagnose operational issues going forward. For example, if the user's input in act 340 includes an indication of the actual cause of the alert condition or event (e.g., if the restaurant manager in this example provided text input indicating that the actual cause for the slow-down in preparing Panini orders was that the press accidentally lost power), then event engine 110 may be modified to collect event data relating to power supplied to the Panini press, alert engine 120 may be modified to incorporate an alert condition based on power supply to the Panini press, and/or inference engine 130 may be modified to correlate speed of service measures relating to Panini orders with power supply to the Panini press. As a result, embodiments of the invention may, over time, become more effective at identifying the occurrence and cause of operational issues, as well as the information which the user considers relevant. As such, embodiments of the invention may reduce incorrect diagnoses, and limit the amount of information which the user is asked to process to only that information which is truly relevant or important, thereby freeing the user's time and mental bandwidth to focus on other issues.

At the completion of act 340, representative process 300 proceeds to act 350, wherein a determination is made whether there is additional video footage and/or data to be displayed to the user. If it is determined that there is no additional video footage and/or data to be displayed, then representative process 300 completes. If it is determined, however, that there is additional video footage and/or data to be displayed to the user, representative process 300 proceeds to act 360, wherein a determination is made whether any change should be made to the additional video footage and/or data based on the input received in the act 340. Again using the above example to illustrate, if the restaurant manager's input in act 340 indicates that video footage of the Panini press shown to her in act 330 does not depict the actual cause of the slowdown on Panini orders, then other video clips which also depict the Panini press may be removed from video footage which had previously been identified for display to her. Any of numerous types of changes may be made to additional video footage and/or data based on input received from a user.

If it is determined in the act 360 that a change is to be made, then representative process 300 proceeds to act 370, wherein the change is made. At the completion of the change, or if it is determined in act 360 that no change is to be made, representative process returns to act 330, wherein the additional video footage and/or data is displayed to the user. Representative process 300 then proceeds on from act 330 as described above.

It should be appreciated that the representative processes 200 and 300 shown in FIGS. 2 and 3, respectively, represent only examples of processes for performing the described functions, and that any of numerous variations are possible. For example, either of representative processes 200 or 300 may include acts not described above, may not include all of the acts described above, and/or may include the acts described above being performed in a different sequence than that which is described above.

It should also be appreciated that although the description above relates to one installation of representative system 100 being used in one restaurant, not all embodiments of the invention are so limited. For example, a system for analyzing restaurant operations may analyze data produced in multiple restaurants, or a single restaurant may employ multiple systems. Any of multiple modes of implementation may be used.

Figure 4:
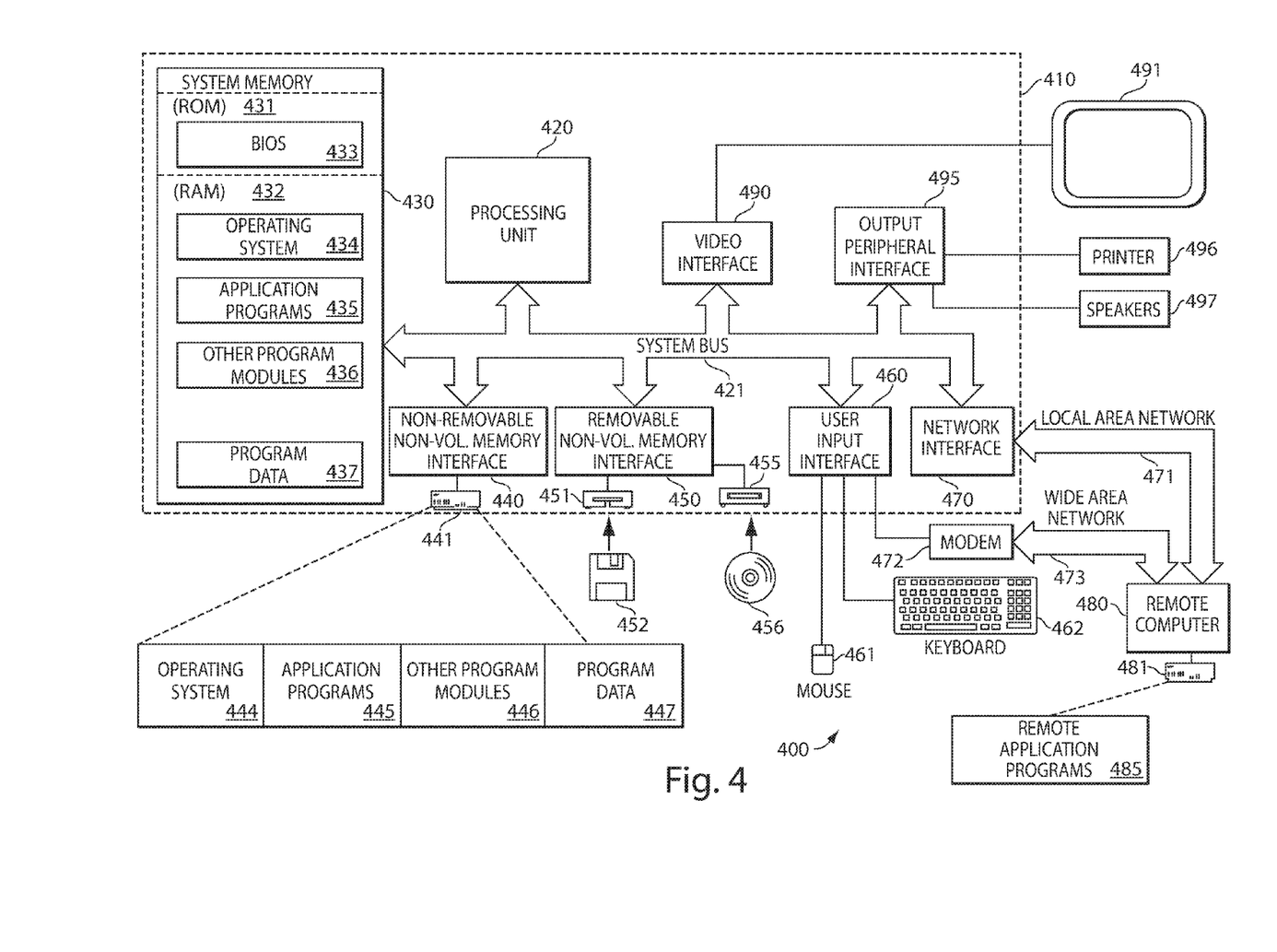
FIG. 4 is a block diagram depicting an example computer system with which some aspects of the invention may be implemented.

As should be apparent from the foregoing description, some aspects of the invention may be implemented using a computing system. FIG. 4 illustrates an example of a suitable computing system environment 400 which may be used to implement aspects of the invention. The computing system environment 400 shown in FIG. 4 is only one example of a suitable computing environment, and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 4, an example system for implementing the invention includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through an non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through a output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for use in a system comprising at least one repository storing data relating to operations of a restaurant and a video capture system for capturing video footage depicting operations of the restaurant, the data comprising information relating to a plurality of events and a plurality of alert conditions, the method comprising acts of:
    (A) identifying a first alert condition from among the plurality of alert conditions;
    (B) automatically analyzing the information relating to the plurality of events to preliminarily identify one or more events from among the plurality of events as potential causes of the first alert condition, wherein the analyzing comprises:
        (B)(1) identifying, from among the plurality of alert conditions, one or more alert conditions similar to the first alert condition;
        (B)(2) identifying, from among the plurality of events, a subset of events occurring substantially contemporaneously with the identified one or more alert conditions; and
        (B)(3) analyzing information relating to the identified subset of events to preliminarily identify the one or more events as potential causes of the first alert condition;
    (C) identifying and retrieving video footage captured by the video capture system corresponding to the one or more events preliminarily identified as potential causes of the first alert condition;
    (D) causing the retrieved video footage corresponding to the one or more events to be displayed via a review interface to a user; and
    (E) receiving input from the user indicating whether the video footage depicts a cause of the first alert condition or does not depict a cause of the first alert condition;
    wherein the system comprises an event engine which identifies data generated by the restaurant's operational systems and stores the identified information in the at least one repository, and wherein the method comprises an act of:
    (F) configuring the event engine to identify additional types of data for storage in the at least one repository.

2. The method of claim 1, wherein the one or more events preliminarily identified as potential causes for the first alert condition comprises a plurality of events, each of the plurality of events has a different level of correlation to the one or more alert conditions, and the act (D) comprises causing a list of the plurality of events to be displayed according to level of correlation.

3. The method of claim 1, wherein the act (D) comprises causing a recommendation on one or more potential remediation actions to be displayed to the user.

4. The method of claim 1, wherein the act (D) comprises automatically instituting one or more remediation actions to address a potential cause for the first alert condition.

5. The method of claim 4, wherein the one or more remediation actions comprises redeploying an employee from one station in the restaurant to another station in the restaurant to address the potential cause for the first alert condition.

6. The method of claim 1, wherein the at least one repository stores data relating to operations of a single restaurant.

7. A system, comprising:
    at least one repository storing data relating to operations of a restaurant, the data comprising information relating to a plurality of events and a plurality of alert conditions;
    a video capture system for capturing video footage depicting operations of the restaurant; and
    at least one computer processor programmed to:
        identify a first alert condition from among the plurality of alert conditions;
        automatically analyze the information relating to the plurality of events to preliminarily identify one or more events from among the plurality of events as potential causes of the first alert condition, wherein the analyzing comprises:
            identifying, from among the plurality of alert conditions, one or more alert conditions similar to the first alert condition;
            identifying, from among the plurality of events, a subset of events occurring substantially contemporaneously with the identified one or more alert conditions; and
            analyzing information relating to the identified subset of events to preliminarily identify the one or more events as potential causes of the first alert condition;
        identify and retrieve video footage captured by the video capture system corresponding to the one or more events preliminarily identified as potential causes of the first alert condition;
        cause the retrieved video footage corresponding to the one or more events to be displayed via a review interface to a user; and
        receive input from the user indicating whether the video footage depicts a cause of the first alert condition or does not depict a cause of the first alert condition;
    wherein the system comprises an event engine which identifies data generated by the restaurant's operational systems and stores the identified information in the at least one repository, and wherein the at least one computer processor is programmed to configure the event engine to identify additional types of data for storage in the at least one repository.

8. The system of claim 7, wherein the one or more events preliminarily identified as potential causes for the first alert condition comprises a plurality of events, each of the plurality of events has a different level of correlation to the one or more alert conditions, and the at least one computer processor is programmed to cause a list of the plurality of events to be displayed according to level of correlation.

9. The system of claim 7, wherein the at least one computer processor is programmed to cause a recommendation on one or more potential remediation actions to be displayed to the user.

10. The system of claim 7, wherein the at least one computer processor is programmed to automatically institute one or more remediation actions to address a potential cause for the first alert condition.

11. The system of claim 10, wherein the one or more remediation actions comprises redeploying an employee from one station in the restaurant to another station in the restaurant to address the potential cause for the first alert condition.

12. The system of claim 7, wherein the at least one repository stores data relating to operations of a single restaurant.

13. At least one non-transitory storage device storing instructions which, when executed in a computer system comprising at least one repository storing data relating to operations of a restaurant and a video capture system for capturing video footage depicting operations of the restaurant, the data comprising information relating to a plurality of events and a plurality of alert conditions, cause the computer system to perform a method comprising acts of:
  (A) identifying a first alert condition from among the plurality of alert conditions;
  (B) automatically analyzing the information relating to the plurality of events to preliminarily identify one or more events from among the plurality of events as potential causes of the first alert condition, wherein the analyzing comprises:
    (B)(1) identifying, from among the plurality of alert conditions, one or more alert conditions similar to the first alert condition;
    (B)(2) identifying, from among the plurality of events, a subset of events occurring substantially contemporaneously with the identified one or more alert conditions; and
    (B)(3) analyzing information relating to the identified subset of events to preliminarily identify the one or more events as potential causes of the first alert condition;
  (C) identifying and retrieving video footage captured by the video capture system corresponding to the one or more events preliminarily identified as potential causes of the first alert condition;
  (D) causing the retrieved video footage corresponding to the one or more events to be displayed via a review interface to a user; and
  (E) receiving input from the user indicating whether the video footage depicts a cause of the first alert condition or does not depict a cause of the first alert condition;
  wherein the system comprises an event engine which identifies data generated by the restaurant's operational systems and stores the identified information in the at least one repository, and wherein the method comprises an act of:
  (F) configuring the event engine to identify additional types of data for storage in the at least one repository.

14. The at least one non-transitory storage device of claim 13, wherein the one or more events preliminarily identified as potential causes for the first alert condition comprises a plurality of events, each of the plurality of events has a different level of correlation to the one or more alert conditions, and the act (D) comprises causing a list of the plurality of events to be displayed according to level of correlation.

15. The at least one non-transitory storage device of claim 13, wherein the act (D) comprises causing a recommendation on one or more potential remediation actions to be displayed to the user.

16. The at least one non-transitory storage device of claim 13, wherein the act (D) comprises automatically instituting one or more remediation actions to address a potential cause for the first alert condition.

17. The at least one non-transitory storage device of claim 16, wherein the one or more remediation actions comprises redeploying an employee from one station in the restaurant to another station in the restaurant to address the potential cause for the first alert condition.

18. The at least one non-transitory storage device of claim 13, wherein the at least one repository stores data relating to operations of a single restaurant.

* * * * *